US00RE41608E

(19) United States
(12) Reissued Patent
Blair et al.

(10) Patent Number: US RE41,608 E
(45) Date of Reissued Patent: Aug. 31, 2010

(54) SYSTEM AND METHOD TO ACQUIRE AUDIO DATA PACKETS FOR RECORDING AND ANALYSIS

(75) Inventors: Christopher Douglas Blair, South Chailey (GB); Roger Louis Keenan, London (GB)

(73) Assignee: Verint Americas Inc., Melville, NY (US)

(21) Appl. No.: 11/509,551

(22) Filed: Aug. 24, 2006

Related U.S. Patent Documents

Reissue of:
(64) Patent No.: 6,757,361
Issued: Jun. 29, 2004
Appl. No.: 10/073,966
Filed: Feb. 14, 2002

U.S. Applications:
(62) Division of application No. 11/477,124, filed on Jun. 28, 2006, which is a division of application No. 09/500,800, filed on Feb. 10, 2000, now Pat. No. 6,404,857, which is a division of application No. 08/936,428, filed on Sep. 24, 1997, now abandoned.

(30) Foreign Application Priority Data

Sep. 26, 1996 (GB) ..... 9620082

(51) Int. Cl.
*H04M 1/64* (2006.01)

(52) U.S. Cl. ..... 379/67.1; 704/275
(58) Field of Classification Search ..... 371/40.1; 379/67.1, 188; 704/275; 709/213, 216, 240; 380/239; 370/248, 352, 60.1; 714/769; 455/422
See application file for complete search history.

(56) References Cited

U.S. PATENT DOCUMENTS 3,855,418 A 12/1974 Fuller
4,093,821 A 6/1978 Williamson
4,142,067 A 2/1979 Williamson
4,567,512 A 1/1986 Abraham
4,837,804 A 6/1989 Akita
4,924,488 A 5/1990 Kosich
4,969,136 A 11/1990 Chamberlin et al.
4,975,896 A 12/1990 D'Agosto, III et al.
5,036,539 A 7/1991 Wrench, Jr. et al.
5,070,526 A 12/1991 Richmond et al.
5,101,402 A 3/1992 Chin et al.
5,166,971 A 11/1992 Vollert
5,260,943 A 11/1993 Comroe et al.
5,274,572 A 12/1993 O'Neill et al.
5,390,243 A 2/1995 Casselman et al.

(Continued)

FOREIGN PATENT DOCUMENTS

EP 0 510 412 10/1992
GB 2 257 872 1/1993

OTHER PUBLICATIONS

Cohen, D. "A Voice Message System", Proceedings of the IFIP TC–6 International Symposium on Computer Message Systems, Computer Message Systems, edited by Ronald P. Uhlig, Bell Northern Research Limited, Ottawa, Canada, Apr. 6–8, 1981, pp. 17–28.

(Continued)

*Primary Examiner*—William D Cumming
(74) *Attorney, Agent, or Firm*—Lawrence A. Aaronson, P.C.

(57) ABSTRACT

A signal monitoring apparatus and method involving devices for monitoring signals representing communications traffic, devices for identifying at least one predetermined parameter by analyzing the context of the at least one monitoring signal, a device for recording the occurrence of the identified parameter, a device for identifying the traffic stream associated with the identified parameter, a device for analyzing the recorded data relating to the occurrence, and a device, responsive to the analysis of the recorded data, for controlling the handling of communications traffic within the apparatus.

29 Claims, 4 Drawing Sheets

NEW

U.S. PATENT DOCUMENTS

| | | | | | |
|---|---|---|---|---|---|
| 5,511,165 | A | * | 4/1996 | Brady et al. | 709/216 |
| 5,535,261 | A | | 7/1996 | Brown et al. | |
| 5,544,176 | A | * | 8/1996 | Fujii et al. | 714/769 |
| 5,581,614 | A | * | 12/1996 | Ng et al. | 380/239 |
| 5,623,539 | A | | 4/1997 | Bassenyemukasa et al. | |
| 5,696,811 | A | | 12/1997 | Maloney et al. | |
| 5,787,253 | A | | 7/1998 | McCreery et al. | |
| 5,818,907 | A | | 10/1998 | Maloney et al. | |
| 5,946,375 | A | | 8/1999 | Pattison et al. | |
| 5,960,063 | A | | 9/1999 | Kuroiwa et al. | |
| 5,983,186 | A | | 11/1999 | Miyazawa et al. | |
| 6,035,017 | A | | 3/2000 | Fenton et al. | |
| 6,058,163 | A | | 5/2000 | Pattison et al. | |
| 6,108,782 | A | | 8/2000 | Fletcher et al. | |
| 6,115,751 | A | * | 9/2000 | Tam et al. | 709/240 |
| 6,314,094 | B1 | * | 11/2001 | Boys | 370/352 |
| 6,418,214 | B1 | | 7/2002 | Smythe et al. | |
| 6,538,684 | B1 | | 3/2003 | Sasaki | |
| 2005/0240656 | A1 | * | 10/2005 | Blair | 709/213 |
| 2006/0165003 | A1 | * | 7/2006 | Partridge | 370/248 |

OTHER PUBLICATIONS

Cohen, D. "On Packet Speech Communication", Proceedings of the Fifth International Conference, Computer Communications: Increasing Benefits to Society, The International Council for Computer Communication, Hosted by American Telephone and Telegraph Company., Atlanta, Georgia, Oct. 27–30, 1980, pp. 269–274.

Cohen, Danny, "Packet communication of online speech", USCI Information Sciences Institute, Marina del Rey, CA, National Computer Conference, 1981, pp. 169–176.

Cohen, Danny, NWG/RFC 741, "Specification for the Network Voice Protocol (NVP)", ISI, DC, Nov. 22, 1977, 40 pages.

Holfelder, Wieland, Tenet Group, International Computer Science Institute and University of California, "VCR(1), MBone VCR—Mbone Video Conference Recorder", Berkley, CA., Nov. 5, 1995, pp. 1–8.

Information Sciences Institute, University of Southern California, Marina del Rey, "RFC:791 Internet Protocal DARPA Internet Program Protocol Specification", Prepared for Defense Advanced Research Projects Agency Information Processing Techniques Office, Arlington, VA., Sep. 1981, pp. 1–45.

Schulzrinne, Henning, "NeVoTImplementation and Program Structure", GMD Fokus, Berlin, Feb. 9, 1996, pp. 1–16.

Schulzrinne, Henning, "Voice Communication Across the Internet: A Network Voice Terminal", Dept. of Electrical and Computer Engineering, Dept. of Computer Science, Univ. of Massachusetts, Amherst, MA. Jul. 29, 1992, pp. 1–34.

Terry, Douglas B. and Daniel C. Swinehart, "Managing Stored Voice in the Etherphone System", Computer Science Laboratory, Xerox Palo Alto Research Center, 1987, pp. 103–104.

Zellweger, Polle T., Douglas B. Terry, and Daniel C. Swinehart, "An Overview of the Etherphone System and Its Applications", Xerox Palo Alto Research Center, Palo Alto, CA., 1988, pp. 160–168.

Lieberman et al., "Some Aspects of Fundamental Frequency and Envelope Amplitude as Related to the Emotional Content of Speech", The Journal of the Acoustical Society of America, vol. 34, previously presented, 922–927 (Jul. 1962).

So–Lin Yen et al. "Intelligent MTS Monitoring System", Oct. 1994, pp. 185–187, Scientific and Research Center for Criminal Investigation, Taiwan, Republic of China.

Network Resource Group of Lawrence Berkeley National Laboratory, *vat–LBNL Audio Conference Tool*, at web.archive.org/web/19980126183021/www–nrg.ee.lbl.gov/vat (Jan. 26, 1998), 5 pp.

Mash Research Team, *vic–video conference*, at b.archive.org/web/19980209092254/mash.cs.berkeley.edu/mash (Feb. 9, 1998), 11 pp.

Mash Research Team, *Player,* at web.archive.org/web/19980209092521/mash.cs.berkely.edu/mash (Feb. 9, 1998), 3 pp.

Intel Corporation, *Intel Internet Video Phone Trial Applet 2.1: The Problems and Pitfalls of Getting H.323 Safety Through Firewalls,* at web.archive.org/web/19980425132417/http://support.intel.com/support/videophone/trial21/h323_wpr.htm™a18 (Apr. 24, 1998), 32 pp.

Posting of Brett Eldridge to muc.lists.firewalls: MS NetMeeting 2.0 and Raptor Eagle vers. 4.0, at groups–beta.google.com/groups/muc.lists.firewalls/browse_thread/thread/ec0255b64bf36ad4?tvc=2 (May 2, 1997), 3 pp.

Press Release, RADCOM, Breakthrough Internetworking Application for Latency & Loss Measurements from RADCOM, at http://web.archive.org/web/19980527022443/www.radcom–inc.com/press21.htm (May 27, 1998), 2 pp.

RADCOM, Supported Protocols, at http://web.archive.org/web/19980527014033/www.radcom–inc.com/protocol.htm (May 27, 1998), 10 pp.

Press Release, RADCOM, RADCOM Adds UNI 4.0 Signalling and MPEG–II Support to ATM Analysis Solutions, at http://web.archive.org/web/19980527022611/www.radcom–inc.com/press13.htm (May 27, 1998), 1 p.

RADCOM, *Prism200 Multiport WAN/LAN/ATM Analyzer,* at http://web.archive.org/web/19980527020144/www.radcom–inc.com/pro–p1.htm (May 27, 1998), 3 pp.

Beckman, Mel, *See and hear your network*at //web.archive.org/web/19990224183147/macworld.zdnet.com/pages/june.96/Reviews.2144.htm1 (Feb. 24, 1999), 3 pp.

AG Group, Inc., *About Satellite,* at //web.archive.org/web/19980206033053/www.aggroup.com/skyline (Feb. 6, 1998), 1 p.

Check Point, *Supported Applications,* at web.archive.org/web/19980212233542/www.checkpoint.com/products/technology/index.html (Feb. 12, 1998), 6 pp.

Check Point, *Stateful Inspection in Action,* at web.archive.org/web/19980212235911/www.checkpoint.com/products/technology/page2.html (Feb. 12, 1998), 4 pp.

Check Point, *Check Point FireWall–1: Extensible Stateful Inspection,* at //web.archive.org/web/19980212235917/www.checkpoint.com/products/technology/page3.html (Feb. 12, 1998), 3 pp.

RADCOM, *PrismLite: Portable WAN/LAN/ATM Protocol Analyzer,* at web.archive.org/web/19980527020156/www.radcom–inc.com/pro–p2.htm (May 27, 1998), 3 pp.

Simpson, David, *Viewing RTPDump Files,* at //bmrc.berkeley.edu/~davesimp/viewingNotes.html (Oct. 12, 1996), 1 p.

Waldbusser, S., *RFC 1757—Remote Network Monitoring Management Information Base,* at //www.faqs.org/rfcs/rfc1747.html (Feb. 1995), 65 pp.

* cited by examiner

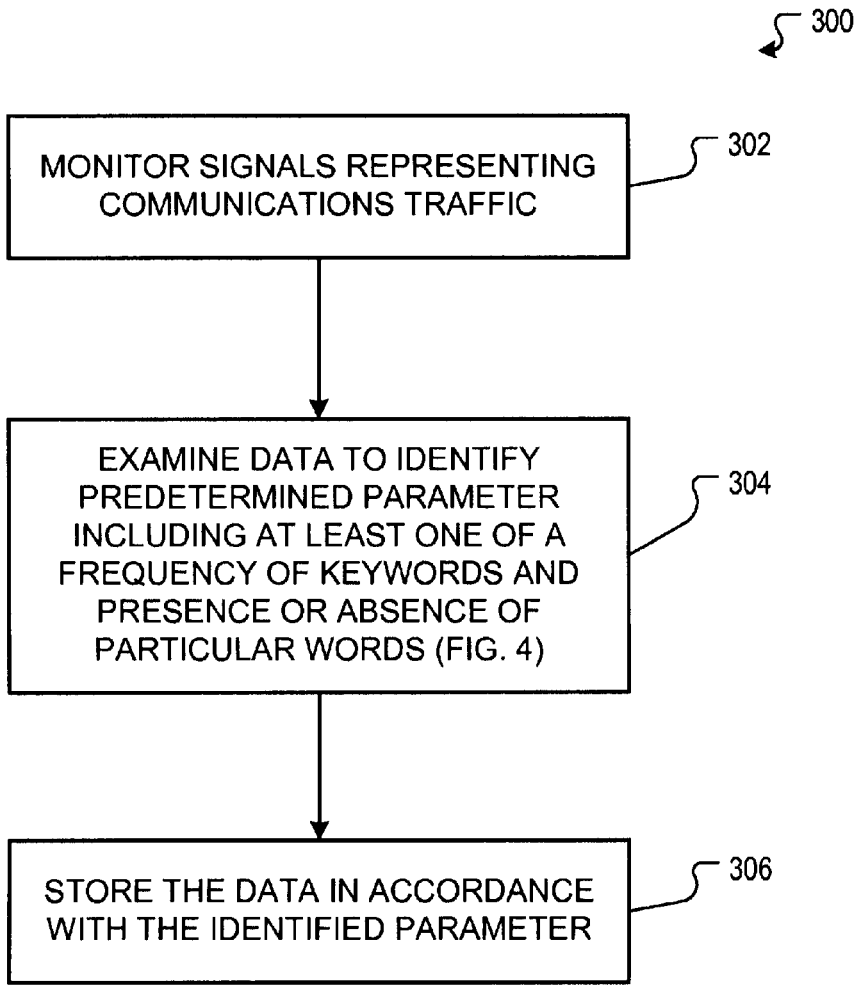
FIG. 3
NEW

PARAMETERS

- NON-VOICE ELEMENTS
- INTERACTIVE VOICE RESPONSE PROMPTS
- COMPUTER SYNTHESIZED SPEECH
- BACKGROUND NOISE
- THE RELATIONSHIP BETWEEN TRANSMISSIONS IN EACH DIRECTION
- THE AMPLITUDE ENVELOPE OF THE SIGNALS
- THE FREQUENCY SPECTRUM OF THE SIGNAL
- THE ACTUAL SPEAKER
- MEASURES OF THE SPEED OF INTERACTION
- THE SEX OF THE SPEAKER(S)
- THE PRESENCE OR ABSENCE OF PARTICULAR WORDS
- THE FREQUENCY AND CONTENT OF PROSODY
- DATE, TIME, DURATION AND DIRECTION OF CALL
- EXTERNALLY GENERATED "TAGGING" INFORMATION
- DEGREE OF INTERRUPTION (I.E. OVERLAP BETWEEN AGENT TALKING AND CUSTOMER TALKING);
- COMMENTS MADE DURING MUSIC OR ON-HOLD PERIODS;
- DELAYS EXPERIENCED BY CUSTOMERS
- CALLER/AGENT TALK RATIOS
- "RELAXED/STRESSED" PROFILE (I.E. DETERMINING CHANGES IN VOLUME, SPEED AND TONE OF SPEECH)
- FREQUENCY OF KEYWORDS HEARD
- FREQUENCY OF REPEAT CALLS
- LANGUAGES USED BY CALLERS
- NORMAL SPEECH PATTERNS OF AGENTS

FIG. 4

NEW

SYSTEM AND METHOD TO ACQUIRE AUDIO DATA PACKETS FOR RECORDING AND ANALYSIS

Matter enclosed in heavy brackets [ ] appears in the original patent but forms no part of this reissue specification; matter printed in italics indicates the additions made by reissue.

*CROSS-REFERENCE TO RELATED APPLICATIONS*

*Notice: More than one reissue application has been filed for the reissue of U.S. Pat. No. 6,757,361. The reissue applications are: "Voice Interaction Analysis Module," Ser. No. 11/509,553, filed on Aug. 24, 2006; "Machine Learning Based Upon Feedback From Contact Center Analysis," Ser. No. 11/509,550, filed on Aug. 24, 2006; "Distributed Analysis of Voice Interaction Data," Ser. No. 11/509,554, filed on Aug. 24, 2006; "Distributed Recording of Voice Interaction Data," Ser. No. 11/509,552, filed on Aug. 24, 2006; "VoIP Voice Interaction Monitor," Ser. No. 11/509,549, filed on Aug. 24, 2006; "VoIP Voice Interaction Recorder," Ser. No. 11/509,551, filed on Aug. 24, 2006 (the present application); and, "Communication Management System for Network-Based Telephones," Ser. No. 11/583,381, filed on Oct. 19, 2006, all of which are divisional reissues of "Signal Monitoring Apparatus Analyzing Voice Communication Content," Ser. No. 11/477,124, filed on Jun. 28, 2006, which is a reissue of U.S. Pat. No. 6,757,361, issued on Jun. 29, 2004.*

BACKGROUND OF THE INVENTION

The present invention relates to signal monitoring apparatus and in particular, but not exclusively to telecommunications monitoring apparatus which may be arranged for monitoring a plurality of telephone conversations.

DESCRIPTION OF THE RELATED ART

Telecommunications networks are increasingly being used for the access of information and for carrying out commercial and/or financial transactions. In order to safeguard such use of the networks, it has become appropriate to record the two-way telecommunications traffic, whether voice traffic or data traffic, that arises as such transactions are carried out. The recording of such traffic is intended particularly to safeguard against abusive and fraudulent use of the telecommunications network for such purposes.

More recently, so-called "call-centers" have been established at which operative personnel are established to deal with enquiries and transactions required of the commercial entity having established the call-center. An example of the increasing use of such call-centers is the increasing use of "telephone banking" services and the telephone ordering of retail goods.

Although the telecommunications traffic handled by such call-centers is monitored in an attempt to preserve the integrity of the call-centre, the manner in which such communications networks, and their related call-centers, are monitored are disadvantageously limited having regard to the data/information that can be provided concerning the traffic arising in association with the call-center.

For example, in large call-centers, it is difficult for supervisors to establish with any confidence that they have accurately, and effectively, monitored the quality of all their staff's work so as to establish, for example, how well their staff are handling customers' enquiries and/or transaction requirements, or how well their staff are seeking to market/publicise a particular product etc.

SUMMARY OF THE INVENTION

The present invention seeks to provide for telecommunications monitoring apparatus having advantages over known such apparatus.

According to one aspect of the present invention there is provided signal monitoring apparatus comprising:

- means for monitoring signals representing communications traffic,
- means for identifying at least one predetermined parameter by analysing the content of at least one monitored signal,
- means for recording the occurrence of the identified parameter,
- means for identifying the traffic stream associated with the identified parameter,
- means for analysing the recorded data relating to the said occurrence, and
- means, responsive to the analysis of the said recorded data, for controlling the handling of communications traffic within the apparatus.

Preferably, the means for controlling the handling of the communications traffic serves to identify at least one section of traffic relative to another.

Also, the means for controlling may serve to influence further monitoring actions within the apparatus.

Advantageously, the analysed contents of the at least one signal comprise the interaction between at least two signals of traffic representing an at least two-way conversation. In particular, the at least two interacting signals relate to portions of interruption or stiltedness within the traffic.

Preferably, the means for monitoring signals can include means for recording signals.

Preferably, the means for recording the occurrence of the parameter comprises means for providing, in real time, a possibly instantaneous indication of said occurrence, and/or comprises means for storing, permanently or otherwise, information relating to said occurrence.

Dependent upon the particular parameter, or parameters, relevant to a call-center provider, the present invention advantageously allows for the improved monitoring of traffic so as to identify which one(s) of a possible plurality of data or voice interactions might warrant further investigation whilst also allowing for statistical trends to be recorded and analysed.

The apparatus is advantageously arranged for monitoring speech signals and indeed any form of telecommunication traffic.

For example, by analysing a range of parameters of the signals representing traffic such as speech, data or video, patterns, trends and anomalies within a plurality of interactions can be readily identified and these can then be used for example, to influence future automated analysis, and rank or grade the conversations and/or highlight conversations likely to be worthy of detailed investigation or playback by the call-center provider. The means for monitoring the telecommunications signals may be advantageously arranged to monitor a plurality of separate two-way voice, data or video conversations, and this makes the apparatus particularly advantageous for use within a call-centre.

The means for monitoring the telecommunications signals advantageously arranged to monitor the signals digitally by any one variety of appropriate means which typically involve the use of high impedance taps into the network and which have little, or no, effect on the actual network.

It should of course be appreciated that the invention can be arranged for monitoring telecommunications signals transmitted over any appropriate medium, for example a hardwired network comprising twisted pair or co-axial lines or indeed a telecommunications medium employing radio waves.

In cases where the monitored signal is not already in digital form, the apparatus can advantageously include analogue/digital conversion means for operating on the signal produced by the aforesaid means for monitoring the telecommunications signals.

It should also be appreciated that the present invention can comprise means for achieving passive monitoring of a telecommunications network or call-centre etc.

The means for identifying the at least one predetermined parameter advantageously includes a Digital Signal Processor which can be arranged to operate in accordance with any appropriate algorithm. Preferably, the signal processing required by the means for identifying the at least one parameter can advantageously be arranged to be provided by spare capacity arising in the Digital Signal Processors found within the apparatus and primarily arranged for controlling the monitoring, compression and/or recording of signals.

As mentioned above, the particular parameters arranged to be identified by the apparatus can be selected from those that are considered appropriate to the requirements of, for example, the call-centre provider.

However, for further illustration, the following is a non-exhaustive list of parameters that could be identified in accordance with the present invention and assuming that the telecommunications traffic concerned comprises a plurality of two-way telephone interactions such as conversations:

- non-voice elements within predominantly voice-related interactions for example dialling, Interactive Voice Response Systems, and recorded speech such as interactive voice response prompts, computer synthesized speech or background noise such as line noise,
- the relationship between transmissions in each direction, for example the delay occurring, or the overlap between, transmissions in opposite directions,
- the amplitude envelope of the signals, so as to determine caller anger or episodes of shouting,
- the frequency spectrum of the signal in various frequency bands,
- advanced parameters characterizing the actual speaker which may advantageously be used in speech authentication;
- measures of the speed of interaction, for example for determining the ratio of word to inter-word pauses,
- the language used by the speaker(s),
- the sex of the speaker(s),
- the presence or absence of particular words, for example word spotting using advanced speech recognition techniques,
- the frequency and content of prosody including pauses, repetitions, stutters, and nonsensical utterances in the conversation,
- vibration or tremor within a voice, and
- the confidence/accuracy with which words are recognized by the receiving party to the conversation so as to advantageously identify changes in speech patterns arising from a caller.

Parameters such as the following, and having no direct relationship to each call's content, can also be monitored

- date, time, duration and direction of call,
- externally generated "tagging" information for transferred calls or calls to particular customers, As will be appreciated, the importance of each of the above parameters and the way in which they can be combined to highlight particular good, or bad, caller interactions can be readily defined by the call-center provided.

Advantageously, the apparatus can be arranged so as to afford each of the parameters concerned a particular weighting, or relative value.

The apparatus may of course also be arranged to identify the nature of the data monitored, for example whether speech, facsimile, modem or video etc. and the rate at which the signals are monitored can also be recorded and adjusted within the apparatus.

According to a further feature of the invention, the means for identifying the at least one parameter can be arranged to operate in real time or, alternatively, the telecommunications signals can be recorded so as to be monitored by the means for identifying at least one parameter at some later stage.

Advantageously, the means for recording the actual occurrence of the identified parameter(s) can be arranged to identify an absolute value for such occurrences within the communications network and/or call-centre as a whole or, alternatively, the aforementioned recording can be carried out on a per-conversation or a per-caller/operative basis.

The means for recording the occurrence of the identified parameter(s) can advantageously be associated means for analysing the results of the information recorded so as to identify patterns, trends and anomalies within the telecommunications network and/or call-center.

Advantageously, the means for recording the occurrence of the identified parameter(s) can, in association with the means for identifying the predetermined parameter and the means for monitoring the telecommunications signals, be arranged to record the aforementioned occurrence in each of the two directions of traffic separately.

Preferably, the means for identifying the source of the two-way traffic includes means for receiving an identifier tagged on to the traffic so as to identify its source, i.e. the particular operative within the call-centre or the actual caller. Alternatively, means can be provided within the telecommunications monitoring apparatus for determining the terminal number, i.e. the telephone number, of the operative and/or the caller.

The aforementioned identification can also be achieved by way of data and/or speech recognition.

It should also be appreciated that the present invention can include means for providing an output indicative of the required identification of the at least one predetermined parameter. Such output can be arranged to drive audio and/or visual output means so that the call-centre provider can readily identify that a particular parameter has been identified and in which particular conversation the parameter has occurred. Alternatively, or in addition, the occurrence of the parameter can be recorded, on any appropriate medium for later analysis.

Of course, the mere single occurrence of a parameter need not establish an output from such output means and the apparatus can be arranged such that an output is only provided once a decision rule associated with such parameter(s) has been satisfied. Such a decision rule can be arranged such that it depends on present and/or past values of the parameter under consideration and/or other parameters.

Further, once a particular conversation has been identified as exhibiting a particular predetermined parameter, or satisfying a decision rule associated with such parameters, the apparatus can be arranged to allow ready access to the telecommunications "line" upon which the conversation is occurring so that the conversation can be interrupted or suspended as required.

As mentioned previously, the apparatus can be arranged to function in real time or, alternatively, the apparatus can include recording means arranged particularly to record the telecommunications traffic for later monitoring and analysis.

Preferably, the apparatus includes means for reconstructing the signals of the telecommunications traffic to their original form so as, for example, to replay the actual speech as it was delivered to the telecommunications network and/or call-center.

The apparatus can therefore advantageously recall the level of amplification, or attenuation, applied to the signal so as to allow for the subsequent analysis of the originating signal with its original amplitude envelope.

Further, the apparatus may include feedback means arranged to control the means for monitoring the telecommunications signals responsive to an output from means being provided to identify the source of the conversation in which the parameter has been identified, or the decision rule associated with the parameter has been exceeded.

A further embodiment of the present invention comprises an implementation in which means for recording and analysing the monitored signals are built into the actual system providing the transmission of the original signals so that the invention can advantageously take the form of an add-in card to an Automatic Call Distribution System or any other telecommunications system.

Also, it will be appreciated that the present invention can be advantageously arranged so as to be incorporated into a call-centre and indeed the present invention can provide for such a call-centre including apparatus as defined above.

In accordance with another aspect of the present invention, there is provided a method of monitoring signals representing communications traffic, and comprising the steps of:

identifying at least one predetermined parameter associated with a monitored signal;

recording the occurrence of the identified parameter; and identifying the traffic stream in which the parameter was identified.

The invention is therefore particularly advantageous in allowing the monitoring of respective parts of an at least two-way conversation and which may include the of analysis of the interaction of those parts.

Of course, the method of the present invention can advantageously be arranged to operate in accordance with the further apparatus features defined above.

*BRIEF DESCRIPTION OF THE DRAWINGS*

The invention is described further hereinafter, by way of example only, with reference to the accompanying drawings in which:

*FIG. 3 is a flowchart of an example process for monitoring communications traffic; and*

*FIG. 4 is a list of exemplary parameters.*

DESCRIPTION OF THE EMBODIMENT

As mentioned above, the apparatus can advantageously form part of a call-centre in which a plurality of telephone conversations can be monitored so as to provide the call-centre operator with information relating to the "quality" of the service provided by the call-center operatives. Of course, the definition of "quality" will vary according to the requirements of the particular call-centre and, more importantly, the requirements of the customers to that call-centre but typical examples are how well the call-centre operatives handle customers telephone calls, or how well an Interactive Voice Response System serves customers calling for, for example, product details.

The system generally comprises apparatus for the passive monitoring of voice or data signals, algorithms for the analysis of the monitored signals and, apparatus for the storage and reporting of the results of the analysis.

Optional features can include apparatus for recording the actual monitored signals particularly if real time operation is not required, and means for reconstructing the monitored signals into their original form so as to allow for, for example, replay of the speech signal.

Figure 1:
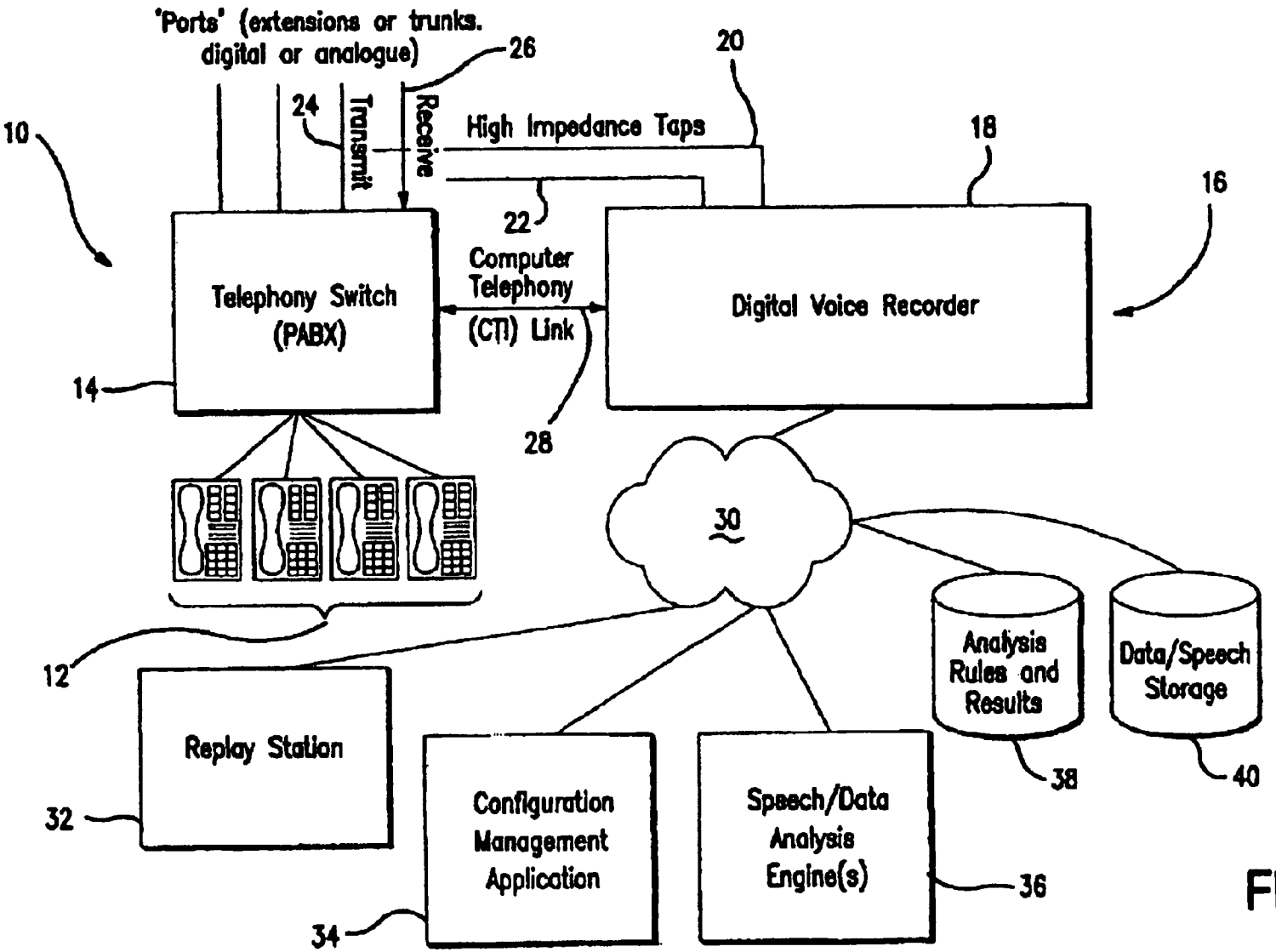
FIG. 1 is a block diagram of a typical recording and analysis system embodying the present invention; [and]

FIG. 1 is a block diagram of a recording and analysis system for use in association with a call-centre 10 which includes an exchange switch 14 from which four telephone terminals 12 extend: each of which is used by one of four call-centre operatives handling customer enquiries/transactions via the exchange switch 14.

The monitoring apparatus 16 embodying the present invention, comprises a digital voice recorder 18 which is arranged to monitor the two-way conversation traffic associated with the exchange switch 14 by way of high impedance taps 20, 22 which are connected respectively to signal lines 24, 26 associated with the exchange switch 14 (*Step 302, FIG. 3*). As will be appreciated by the arrows employed for the signal lines 24, 26, the high impedance tap 20 is arranged to monitor outgoing voice signals from the call-centre 10 whereas the high impedance tap 22 is arranged to monitor incoming signals to the call-centre 10. The voice traffic on the lines 24, 26 therefore form a two-way conversation between a call-centre operative using one of the terminals 12 and a customer (not illustrated).

The monitoring apparatus 16 embodying the present invention further includes a computer telephone link 28 whereby data traffic appearing at the exchange switch 14 can be monitored as required.

The digital voice recorder 18 is connected to a network connection 30 which can be in the form of a wide area network (WAN), a local area network (LAN) or an internal bus of a central processing unit of a computer.

Also connected to the network connection 30 is a replay station 32, a configuration arrangement application station 34, a station 36 providing speech and/or data analysis engine(s) and also storage means comprising a first storage means 38 for the relevant analysis rules and the results obtained and a second storage means 40 for storage of the data and/or speech monitor.

Figure 2:
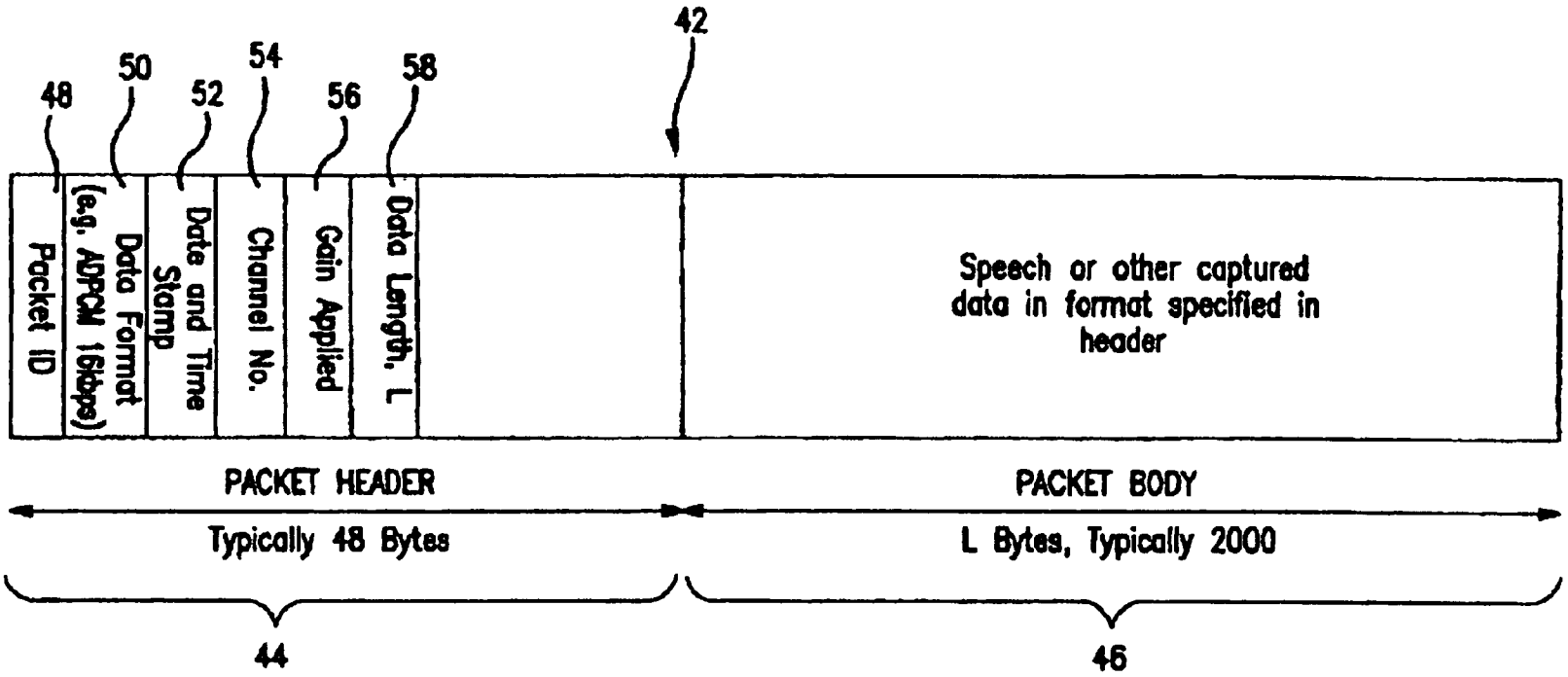
FIG. 2 is a diagram illustrating a typical data packetisation format employed within the present invention*;*

FIG. 2 illustrates the typical format of a data packet 42 used in accordance with the present invention and which comprises a packet header 44 of typically 48 bytes and a packet header 46 of typically of 2000 bytes.

The packet header is formatted so as to include the packet identification 48, the data format 50, a data and time stamp 52, the relevant channel number within which the data arises 54, the gain applied to the signal 56 and the data length 58.

The speech, or other data captured in accordance with the apparatus of the present invention, is found within the packet body 46 and within the format specified within the packet header 44.

The high impedance taps 20, 22 offer little or no effect on the transmission lines 24, 26 and, if not in digital form, the monitored signal is converted into digital form. For example, when the monitored signal comprises a speech signal, the signal is typically converted to a pulse code modulated (PCM) signal or is compressed as an Adaptive Differential PCM (ADPCM) signal.

Further, where signals are transmitted at a constant rate, the time of the start of the recordings is identified, for example by voltage or activity detection, i.e. so-called "vox" level detection, and the time is recorded. With asynchronous data signals, the start time of a data burst, and optionally the intervals between characters, may be recorded in addition to the data characters themselves.

The purpose of this is to allow a computer system to model the original signal to appropriate values of time, frequency and amplitude so as to allow the subsequent identification of one or more of the various parameters arising in association with the signal (*see, FIG. 4*). The digital information describing the original signals is then analysed at station 36 (*Step 304; FIG. 3*), in real time or later, to determine the required self of metrics, i.e., parameters, appropriate to the particular application.

*FIG. 3 is a flowchart of an example process 300 for monitoring communications traffic. At stage 302, signals representing communications traffic are monitored. For example, the digital voice recorder 18 can monitor two-way conversation traffic associated with the exchange switch 14. At stage 304, a predetermined parameter is identified by analyzing the content. For example, a digital signal processor programmed with an appropriate algorithm can identify the predetermined parameter. At stage 306, the occurrence of the identified parameter is recorded. For example, the first storage 38 (analysis rules and results) can store the occurrence of the identified parameter. At stage 308, the traffic stream associated with the parameter is identified. For example, the speech/data analysis engine 36 can identify the traffic stream. At stage 310, the recorded data relating to the occurrence is analyzed. For example, the speech/data analysis engine 36 can analyze the recorded data stored in the first storage 38.*

A particular feature of the system is in recording the two directions of data transmission separately so allowing further analysis of information sent in each direction independently (*Step 306; FIG. 3*). In analogue telephone systems, this may be achieved by use of a four-wire (as opposed to two-wire) circuit whilst in digital systems, it is the norm to have the two directions of transmission separated onto separate wire pairs. In the data world, the source of each data packet is typically stored alongside the contents of the data packet.

A further feature of the system is in recording the level of amplification or attenuation applied to the original signal. This may vary during the monitoring of even a single interaction (e.g. through the use of Automatic Gain Control Circuitry). This allows the subsequent reconstruction and analysis of the original signal amplitude.

Another feature of the system is that monitored data may be "tagged" with additional information such as customer account numbers by an external system (e.g. the delivery of additional call information via a call logging port or computer telephony integration (CTI) port).

The importance of each of the parameters and the way in which they can be combined to highlight particularly good or bad interactions is defined by the user of the system. One or more such analysis profiles can be held in the system. These profiles determine the weighting given to each of the above parameters.

The profiles are normally used to rank a large number of monitored conversations and to identify trends, extremes, anomalies and norms. "Drill-down" techniques are used to permit the user to examine the individual call parameters that result in an aggregate or average score, and, further, allow the user to select individual conversations to be replayed to confirm or reject the hypothesis presented by the automated analysis.

A particular variant that can be employed in any embodiment of the present invention uses feedback from the user's own scoring of the replayed calls to modify its own analysis algorithms. This may be achieved using neutral network techniques or similar giving a system that learns from the user's own view of the quality of recordings.

A variant of the system uses its own and/or the scoring/ranking information to determine its further patterns of operation i.e.

- determining which recorded calls to retain for future analysis,
- determining which agents/lines to monitor and how often, and
- determining which of the monitored signals to analyse and to what depth.

In many systems it is impractical to analyse all attributes of all calls hence a sampling algorithm may be defined to determine which calls will be analysed. Further, one or more of the parties can be identified (e.g. by calling-line identifier for the external party or by agent log-on identifiers for the internal party). This allows analysis of the call parameters over a number of calls handled by the same agent or coming from the same customer.

The system can use sparse capacity on the digital signal processors (DSPs) that control the monitoring, compression or recording of the monitored signals to provide some or all of the analysis required. This allows analysis to proceed more rapidly during those periods when fewer calls are being monitored.

Spare CPU capacity on a PC at an agent's desk could be used to analyse the speech. This would comprise a secondary tap into the speech path being recorded as well as using "free" CPU cycles. Such an arrangement advantageously allows for the separation of the two parties, e.g. by tapping the headset/handset connection at the desk. This allows parameters relating to each party to be stored even if the main recording point can only see a mixed signal.

A further variant of the system is an implementation in which the systems recording and analysing the monitored signals are built into the system providing the transmission of the original signals (e.g. as an add-in card to an Automatic Call Distribution (ACD) system).

The apparatus illustrated is particularly useful for identifying the following parameters:

- degree of interruption (i.e. overlap between agent talking and customer talking),
- comments made during music or on-hold periods.
- delays experienced by customers (i.e. the period from the end of their speech to an agent's response),
- caller/agent talk ratios, i.e. which agents might be talking too much.

However, it should be appreciated that the invention could be adapted to identify parameters such as:

- "relaxed/stressed" profile of a caller or agent (i.e. by determining changes in volume, speed and tone of speech)

frequency of keywords heard (separately from agents and from callers) e.g. are agents remembering to ask follow-up questions about a certain product/service etc; or how often do customers swear at each agent? Or how often do agents swear at customers?

frequency of repeat calls. A combination of line, ID and caller ID can be provided to eliminate different people calling from single switchboard/business number languages used by callers?

abnormal speech patterns of agents. For example if the speech recognition applied to an agent is consistently and unusually inaccurate for, say, half an hour, the agent should be checked for: drug abuse, excessive tiredness, drunkenness, stress, rush to get away etc.

It will be appreciated that the illustrated and indeed any embodiments of the present invention can be set up as follows.

The Digital Trunk Lines (e.g. T1/E1) can be monitored trunk side and the recorded speech tagged with the direction of speech. A MediStar Voice Reorder chassis can be provided typically with one or two E1/T1 cards plus a number of DSP cards for the more intense speech processing requirements.

Much of its work can be done overnight and in time, some could be done by the DSPs in the mediastar's own cards. It is also necessary to remove or at least recognise, periods of music, on-hold periods, IVR rather than real agents speaking etc. thus, bundling with Computer Integrated Telephony Services such as Telephony Services API (TSAPI) in many cases is appropriate.

Analysis and parameter identification as described above can then be conducted. However, as noted, if it is not possible to analyse all speech initially, analysis of a recorded signal can be conducted.

In any case the monitoring apparatus may be arranged to only search initially for a few keywords although re-play can be conducted so as to look for other keywords.

It should be appreciated that the invention is not restricted to the details of the foregoing embodiment. For example, any appropriate form of telecommunications network, or signal transmission media, can be monitored by apparatus according to this invention and the particular parameters identified can be selected, and varied, as required.

What is claimed is:

[1. A signal monitoring system for monitoring and analyzing communications passing through a monitoring point, the system comprising:

a digital voice recorder (18) for monitoring two-way conversation traffic streams passing through the monitoring point, said digital voice recorder having connections (20) for being operatively attached to the monitoring point;

a digital processor (30) connected to said digital voice recorder for identifying at least one predetermined parameter by analyzing the voice communication content of at least one monitored signal taken from the traffic streams;

a recorder (38) attached to said digital processor for recording occurrences of the predetermined parameter;

a traffic stream identifier (36) for identifying the traffic stream associated with the predetermined parameter;

a data analyzer (36) connected to said digital processor for analyzing the recorded data relating to the occurrences; and a communication traffic controller (34) operatively connected to said data analyzer and, operating responsive to the analysis of the recorded data, for controlling the handling of communications traffic within said monitoring system.]

[2. The monitoring system of claim 1, wherein said at least one predetermined parameter includes a frequency of keywords identified in the voice communication content of the at least one monitored signal.]

[3. The monitoring system of claim 1, wherein said digital processor further identifies episodes of anger or shouting by analyzing amplitude envelope.]

[4. The monitoring system of claim 1, wherein said at least one predetermined parameter is a prosody of the voice communication content of the at least one monitored signal.]

[5. The monitoring system of claim 1, wherein said connections for being operatively attached to the telephony exchange switch are attached via high impedance taps (20) to telephone signal lines (24, 26) attached to said telephony exchange switch.]

[6. The monitoring system of claim 1, wherein said communication traffic controller serves to identify at least one section of traffic relative to another so as to identify a source of the predetermined parameter.]

[7. The monitoring system of claim 1, wherein said communication traffic controller serves to influence further monitoring actions within the apparatus.]

[8. The monitoring system of claim 1, wherein the analyzed contents of the at least one monitored signal comprise the interaction between at least two signals representing an at least two-way conversation.]

[9. The monitoring system of claim 1, wherein the recorder operates in real time to provide a real-time indication of the occurrence.]

[10. The monitoring system of claim 1, wherein said digital voice recorder comprises an analog/digital convertor (18) for converting analog voice into a digital signal.]

[11. The monitoring system of claim 1, wherein said digital processor as a Digital Signal Processor (30) arranged to operate in accordance with an analyzing algorithm.]

[12. The monitoring system of claim 1, wherein the digital processor is arranged to operate in real time.]

[13. The monitoring system of claim 1, further comprising a replay station (32) connected to said digital processor and arranged such that the voice communication content of the at least one monitored signal can be recorded and monitored by said digital processor for identifying the at least one parameter at some later time.]

[14. The monitoring system of claim 1, wherein the at least one predetermined parameter comprises plural predetermined parameters and wherein said recorder records the occurrence of the plural predetermined parameters in each of the two directions of traffic separately.]

[15. The monitoring system of claim 1, wherein said traffic stream identifier comprises a means for receiving an identifier tagged onto the traffic so as to identify its source.]

[16. The monitoring system of claim 1, wherein said digital voice recorder for monitoring the traffic streams is operative responsive to an output from said traffic stream identifier identifying the source of the conversation in which the predetermined parameter has been identified, or a threshold occurrence of the predetermined parameter has been exceeded.]

[17. The monitoring system of claim 1, wherein said digital voice recorder, said digital processor, said recorder, said traffic stream identifier, and said data analyzer reside on an add-in card to a telecommunications system.]

*18. A method for recording audio data packets, comprising:*

*monitoring audio data packets received at a switch associated with a call center, the audio data packets being transmitted over a compputer network and comprising packet headers and packet bodies;*

*examining data within the audio data packets by using a processor that is communicatively connected to the switch to identify at least one speaker-independent predetermined parameter associated with two-way voice communication; and*

*storing at least a portion of the audio data packets in a storage device communicatively connected to the prpcessor in accordance with the at least one speaker-independent predetermined parameter.*

*19. The method of claim 18, wherein the processor analyzes the packet headers.*

*20. The method of claim 18, wherein examining includes determining telephone interactions to which the audio data packets belong.*

*21. The method of claim 18, wherein examining includes sorting the audio data packets in accordance with a timestamp.*

*22. The method of claim 18, further comprising identifying, by the processor, the voice communication content included in the packet bodies of the audio data packets.*

*23. The method of claim 22, wherein identifying voice communication content includes identifying a frequency of keywords identified in the audio data packets received over the computer network.*

*24. The method of claim 22, wherein identifying voice communication content includes identifying episodes of anger or shouting based upon an amplitude envelope associated with the audio data packets.*

*25. The method of claim 22, wherein identifying voice communication content includes identifying a prosody associated with the voice communication content of the audio data packets.*

*26. The method of claim 22, wherein storing in the storage device is based upon identification of voice communication content that includes the at least one speaker-independent predetermined parameter.*

*27. The method of claim 22, wherein identifying voice communication content includes examining incoming and outgoing traffic streams to identify whether a talk-over condition exists with respect to the audio data packets.*

*28. The method of claim 22, wherein identifying voice communication content includes identifying whether one or more of a predetermined group of words exists with respect to the audio data packets.*

*29. The method of claim 22, wherein identifying voice communication content includes identifying stress in voice content associated with the audio data packets.*

*30. The method of claim 29, wherein stress is identified by determining changes in volume, speed and tone of voice content associated with the audio data packets.*

*31. The method of claim 22, wherein identifying voice communication content includes identifying a delay between audio data packet transmissions in opposite directions.*

*32. The method of claim 18, wherein the examining includes analyzing the packet bodies by the processor.*

*33. A system operable to acquire audio data packets for recording and analysis, comprising:*

*an audio data recorder operable to acquire data packets associated with a voice interaction transmitted over a computer network to a call center, the audio data packets comprising packet headers and a packet bodies;*

*an analysis module operable to analyze the data packets by identifying at least one speaker-independent predetermined parameter associated with two-way voice communication; and*

*a storage module operable to store at least a portion of the audio data packets in accordance with the at least one speaker-independent predetermined parameter.*

*34. The system of claim 33, wherein the analysis module is operable to extract data from the packet header, and to analyze the packet body.*

*35. The system of claim 33, wherein the audio data recorder is further operable to determine telephone interactions to which the data packets belong.*

*36. The system of claim 33, wherein the audio data packets are sorted in accordance with a timestamp.*

*37. The system of claim 33, wherein analysis of the packet bodies comprises identifying voice communication content included in the packet bodies of the audio data packets.*

*38. The system of claim 37, wherein identifying voice communication content includes identifying a frequency of keywords identified in the audio data packets received over the computer network.*

*39. The system of claim 37, wherein identifying voice communication content includes identifying episodes of anger or shouting based upon an amplitude envelope associated with the audio data packets.*

*40. The system of claim 37, wherein identifying voice communication content includes identifying a prosody associated with the voice communication content of the audio data packets.*

*41. The system of claim 37, wherein the storage module stores the portion of the audio data packets based upon identification of voice communication content that includes the at least one speaker-independent predetermined parameter.*

*42. The system of claim 37, wherein identifying voice communication content includes examining incoming and outgoing traffic streams to identify whether a talk-over condition exists with respect to the audio data packets.*

*43. The system of claim 37, wherein identifying voice communication content includes identifying whether one or more of a predetermined group of words exists with respect to the audio data packets.*

*44. The system of claim 37, wherein identifying voice communication content includes identifying stress voice content associated with the audio data packets.*

*45. The system of claim 37, wherein stress is identified by determining changes in volume, speed and tone of voice content associated with the audio data packets.*

*46. The system of claim 37, wherein identifying voice communication content includes identifying a delay between data packet transmissions in opposite directions.*

* * * * *